United States Patent [19]
Buchanan et al.

[11] Patent Number: 5,552,121
[45] Date of Patent: Sep. 3, 1996

[54] CONTAINMENT OF HEAVY VAPOR CLOUDS

[75] Inventors: J. Scott Buchanan, Hamilton, N.J.;
Mohsen N. Harandi, Langhorne, Pa.;
Frederick J. Krambeck, Cherry Hill;
Klaus W. Schatz, Lawrenceville, both of N.J.

[73] Assignee: Phillips Petroleum Company, Bartlesville, Okla.

[21] Appl. No.: 296,605

[22] Filed: Aug. 29, 1994

[51] Int. Cl.⁶ .............................. A62D 3/00; B01D 50/00
[52] U.S. Cl. ........................ 422/171; 422/169; 588/259
[58] Field of Search ...................... 422/168, 169, 422/170, 171, 177, 190; 423/240 R, 240 S, 489, 490, 492, 495, 497, 499.1; 588/248, 259, 249

[56] References Cited

U.S. PATENT DOCUMENTS

| | | | |
|---|---|---|---|
| 4,210,460 | 7/1980 | Seidenberger | 134/7 |
| 4,552,624 | 11/1985 | Clarkson | 204/1 T |
| 4,938,935 | 7/1990 | Audeh et al. | 423/240 |
| 4,938,936 | 7/1990 | Yan | 423/240 |
| 4,939,833 | 7/1990 | Thomas | 29/401 |
| 4,985,220 | 1/1991 | Audeh et al. | 423/240 R |
| 5,041,146 | 8/1991 | Simmerlein-Erlbacher | 55/126 |
| 5,098,668 | 3/1992 | Callen et al. | 422/111 |
| 5,145,651 | 9/1992 | Lake | 422/129 X |
| 5,254,798 | 10/1993 | Zoback | 588/259 |
| 5,277,881 | 1/1994 | Partridge, Jr. et al. | 422/241 |
| 5,286,456 | 2/1994 | Schatz | 422/117 |
| 5,465,536 | 11/1995 | Buchanan et al. | 52/198 |

OTHER PUBLICATIONS

Hazardous Materials Spills Conference, 1988, E. C. Norman, pp. 363–365.

Kirk–Othmer *Encyclopedia of Chemical Technology*, 3rd Ed., vol. 1, p. 624, pp. 654–655, 1980.

*Primary Examiner*—Robert Warden
*Assistant Examiner*—Robert Carpenter

[57] ABSTRACT

A system for containing and neutralizing a heavy vapor cloud from a potential source of hazardous vapor, such as HF from an HF alkylation unit, comprising a primary containment enclosure for containing and neutralizing a major portion of the vapor in the event of a leak, and a secondary fence line spaced from the primary enclosure for absorbing the vapor as the cloud passes therethrough.

24 Claims, 7 Drawing Sheets

CONTAINMENT OF HEAVY VAPOR CLOUDS

BACKGROUND OF THE INVENTION

1. Field of the Invention

The present invention relates to a system for containing and neutralizing heavy vapor clouds of corrosive and toxic substances, such as hydrogen fluoride (HF), hydrofluoric acid, ammonia, chlorine and the like. More particularly, the present invention relates to a system for containing and neutralizing such substances in the event of an accidental release.

2. Description of Prior Art

Hydrofluoric acid is toxic and corrosive. In gaseous vapor or liquid form, hydrofluoric acid attacks the skin, and will on contact cause ulceration of mucous membranes and possibly chemical pneumonia to those exposed to it. Hydrofluoric acid is, however, an industrially important chemical. It is used to manufacture fluorine and to prepare fluorides and other chemical compounds. It is also used as a catalyst for isomerization, condensation, polymerization and hydrolysis reactions. The petroleum industry uses anhydrous hydrogen fluoride primarily as a liquid catalyst for the alkylation of olefinic hydrocarbons to produce alkylate for increasing the octane number of gasoline.

The petroleum refining industry has always recognized the potential for hazard created by HF alkylation units. Accordingly, the industry has consistently ensured that a high level of safety is maintained by use of superior mechanical and metallurgical specifications, and operational practices in the design, construction and operation of these units. As a result, the HF alkylation process has enjoyed an almost unparalleled record of industrial safety. However, the industry has continued to seek enhancement of the intrinsic safety of these units to secure a higher level of potential operating safety and to guard against the consequences of an uncontrolled release of unit contents.

The potential magnitude of the risk inherent in operating an HF alkylation unit may be reduced by a number of qualitative methods that have been proposed for treating HF spills. The most common method is the use of a simple water drench system. Kirk-Othmer Encyclopedia of Chemical Technology, 3rd Edition, Volume 1, page 655 reports that water the most common absorption liquid is used for removing acidic gases, especially if the last contact is with water of alkaline pH. However, because of the aerosol nature of an HF cloud in which the HF droplets are in the order of 0.1 micron and thus very small compared to droplets of water in a simple water drench, the water drench generally has difficulty in removing all the HF present in the cloud.

U.S. Pat. No. 4,210,460 relates to treating an HF liquid spill by applying to the spill a quantity of an aqueous solution of calcium acetate equal to at least seven times the estimated volume of the spill, and thereafter treating the spill with powdered magnesium oxide. The mixture is tested using a pH indicator such as bromothymol blue. After the mixture reaches a persistent blue color, indicating a safe state, the spill is cleaned up mechanically.

At the 1982 Hazardous Material Spills Conference, Edward C. Norman of National Foam System Inc reported the application of limestone and then CHF-784 foam (a proprietary composition) to the contents of a damaged tank emitting an HF cloud. An immediate reduction in fume evolution was apparent after the foam application.

Gordon K. Braley, at the proceedings of the 1980 National Conference on Control of Hazardous Material Spills, in Louisville, Ky. on May 15, 1980 reported the treatment of relatively small amounts of controlled liquid spills of anhydrous hydrogen fluoride with high molecular weight polymers including polyacrylamide, polymethyl methacrylate, and polyvinyl alcohol. These materials applied in the form of a bead polymer formed a skin over the spill preventing fuming of the liquid. Polyacrylamide was deemed the most effective skin-forming agent.

While these methods may be effective, it is desirable to provide a secondary line of protection to further enhance the operational safety of commercial operations using HF.

SUMMARY OF THE INVENTION

The present invention provides a secondary line of protection to further enhance the operational safety of commercial operations using HF. The secondary line of protection is used in combination with at least one primary containment system.

The present invention provides an effective system for containing and neutralizing heavy vapor clouds. In accordance with a broad aspect of the present invention there is provided a system for containing and neutralizing a heavy vapor cloud from a potential source of hazardous vapor comprising primary means enclosing the source for containing and neutralizing a major portion of the vapor in the event of a leak, and secondary means spaced from the primary means for absorbing the vapor as the cloud passes therethrough.

DESCRIPTION OF SPECIFIC EMBODIMENTS

Secondary Containment Systems

Primary containment strategies such as using additives in the HF acid catalyst, barriers in close proximity to and around the alkylation unit, flow restrictors in nozzles and pipes, and water sprays can result in mitigation of a 2 inch pressurized HF leak from an HF alkylation unit by about 99% or down to about 200 ppm in a vapor cloud. Attainment of a goal of about 20 ppm level of HF in the vapor cloud moving along the ground would require about a 99.90% reduction. The final reduction step of from about 200 ppm to 20 ppm is accomplished by a fence line structure and dry powder absorption in accordance with this aspect of the present invention.

When a 2 inch HF pressurized release is mitigated 99% by primary containment means, the remaining airborne HF at a few hundred feet from the HF vapor source, and at typical temperate zone atmospheric temperature and humidity, will be in a vapor form rather than in a visible aerosol state. Further, the vapor cloud travels along the ground at about wind speed because of the relatively high density of the cloud.

Figure 1:
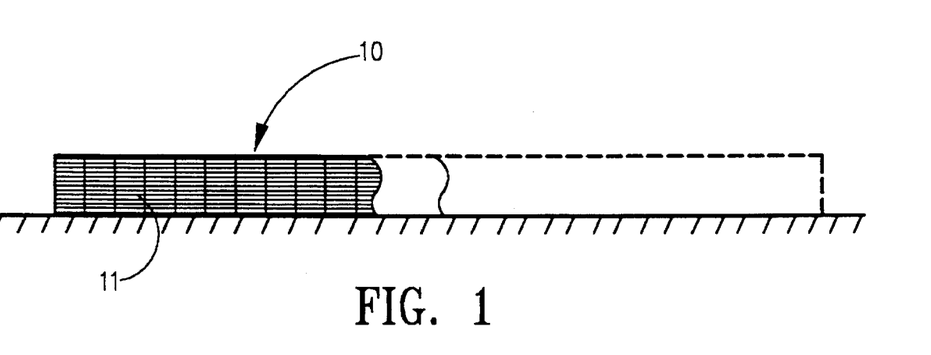
FIG. 1 is a side elevation view of a secondary fence means for absorbing vapor in accordance with the present invention.

A shown in FIG. 1, an absorbent fence line 10 is located at least between an HF alkylation unit and any populated areas. The absorbent fence line 10 is constructed of reactive modules through which the vapor cloud passes such that on the outside of the fence the HF concentration is 20 ppm or less.

Figure 2:
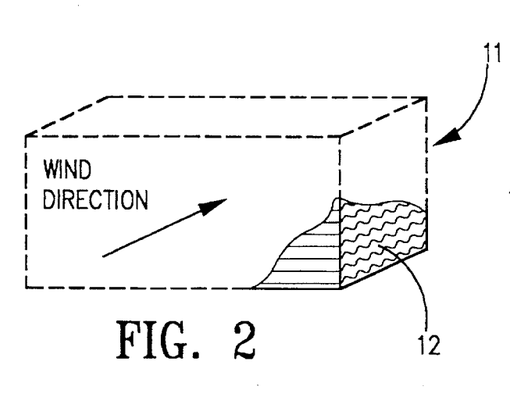
FIG. 2 is a perspective view of an element of the fence means of FIG. 1 showing a portion of the element with the remainder in phantom lines to illustrate the relative size of the element.
Figure 3:
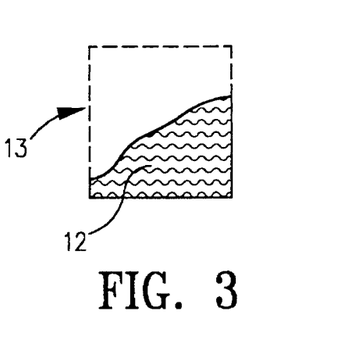
FIG. 3 is a end elevation view of the element of FIG. 2.
Figure 4:
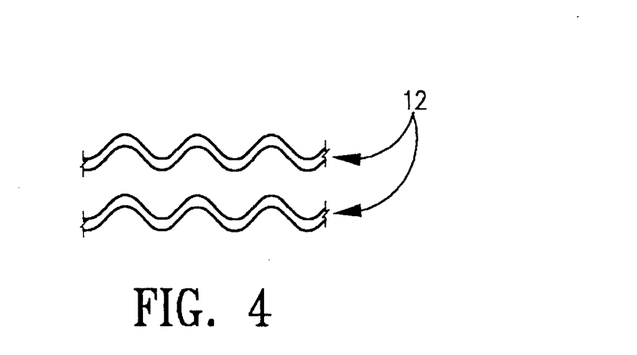
FIG. 4 is enlarged end view of two panels of the element of FIG. 3.

FIG. 1 depicts the fence 10 which in this embodiment is composed of 1,500 modules arranged to provide a fence of 40 ft height and 1,200 ft length. As shown in FIGS. 2, 3 and 4, each module 11 is suitable 8'×4'×4' and includes a nested stack of corrugated panels 12. The vertical spacing between the panels is from about ⅛" to about 3.0", and preferably about 1.0".

Each module 11 is constructed of forty-eight corrugated panels 12 which are stacked on 1" vertical pitch. Panels are made of 1/16" thick polypropylene, or similar HF resistance material. Panels have approximately 48 ft² surface area on each upward and downward facing side. Thus, each module has 2304 ft² per side facing upwardly and also facing downwardly. Both the upside and downside of the individual panels are impregnated with dry powders e.g. metal oxides like titanium oxide ($TiO_2$), alumina ($Al_2O_3$), calcium oxide (CaO), or with metal carbonates like lime stone powder ($CaCo_3$), sodium bicarbonate ($NaHCO_3$), or with metal hydroxides like calcium hydroxide ($Ca(OH)_2$). A suitable binder may be used to hold the powder to the surfaces of the panels. As the wind carries the HF vapor cloud through the module 11, the HF reacts with the dry powders at the surface of the panels 12.

In laboratory tests, the reaction rate of different dry powders to form a metal fluoride were determined. As a example, sodium bicarbonate reacts with hydrogen fluoride in accordance with the following molecular formula.

$$NaHCO_3 + HF \rightarrow NaF + H_2O + CO_2 \qquad \text{(Eq. 1)}$$

The reaction products sodium fluoride, water and carbon dioxide appear on the right side of Equation 1.

Flow experiments with co-current flow of an HF cloud and sodium bicarbonate powder showed that conversions of 90%, on average, can be achieved with residence times of 1.3 seconds. Wind at a velocity of 3.15 mph would require about 1.3 seconds to traverse a corrugated panel having a 4 ft width. Thus, a cloud entering with as high as 200 ppm HF and, at 90% conversion, would exit the downwind side of the fence at 20 ppm. Obviously, if a powder (e.g. alumina) that is less active than sodium bicarbonate is used, the wall thickness or the path through the wall would have to be increased to obtain the same amount of conversion as with sodium bicarbonate powder.

The fence line module aspect of the present invention provides a secondary cleanup step, where the initial and major cleanup steps have already been done by the primary containment systems and there is a remaining cloud of low concentration HF. To build in a safety margin, it is preferable to assume that about 200 ppm of HF will arrive at the fence line, even though the primary containment devices will probably permit less than 200 ppm of HF to pass. Each fence line module is sized to contain enough dry powder to mitigate a 200 ppm HF cloud down to at least about 20 ppm. Each module can be sized to reduce the concentration even further.

As noted above, a typical wall may be in the order of 40 ft high×4 ft thickness facing a populated area. The height required depends on atmospheric stability. At high stability (low turbulence), the height can be calculate with the following equation $$h = (\tan \alpha)d; \qquad \text{(Eq. II)}$$

where

α=angle of elevation of 3°–6° at source to top of the cloud at d;

h=wall height, ft; and d=distance from HF source, ft.

For example, at 600 feet from the HF source and with a 4° elevation from source to top of HF cloud at 600 feet, the height should be 42 feet. Specifically h=(tan 4°)d=0.00699× 600=41.9 feet. The angle of elevation increases with an increase in turbulence. The angle is an experimentally determined angle for high stability expansion of a high density cloud.

The length of the fence is determined by how much the cloud will spread horizontally from the point of origin. Depending on atmospheric conditions, there is approximately a 70–90 degree enclosed angle of spreading from the point of origin.

The fence length also depends on atmospheric stability. At high stability, the length is calculated with the following equation:

$$L = 2d(\tan \beta/2); \qquad \text{(Eq. III)}$$

where

L=length of fence;

d=distance of fence from source; and

D=enclosed angle of HF horizontal spreading.

For example, with an enclosed angle of 90° for horizontal spreading of HF, a fence at 600 feet from the source should be at least 1,200 feet long. Specifically L=2d(tan β/2)= 2(600)(tan 90°/2)=2(600)(1)=1,200 feet. Thus, as a general rule, the fence length should be about twice the distance from the source. The fence line may be arcuately formed and have a circumferential distance at least twice the radius from the primary means to the fence line. However, it should be noted that the enclosed angle decreases with an increase in wind velocity.

At high turbulence, which may be caused by wind and/or terrain and ground structures, the cloud will disperse more rapidly to provide the desired 20 ppm at ground level before the fence.

The elevation and horizontal angle of the above Equations II and III is based on 1986 data developed by chemical industry HF users and produces at the DOE Nevada Test Site where large scale HF release tests were performed. The data was used to generate a mathematical model for computing the shape of an HF cloud. Equations II and III contemplate the worst case where there is high atmospheric stability and therefore relatively slight atmospheric dispersal due to turbulence.

The primary containment systems are designed to reduce the amount of HF in the atmosphere such that the wind carries not greater than from about 200 ppm to about 400 ppm HF to the wall. Since the wind must be able to penetrate the wall, the pressure drop across the wall should be relatively small so that the wind is not deflected up and over the wall, but rather breaks up into individual streams passing between adjacent panels in the wall.

The panels 11 are corrugated in this embodiment and are preferably vertically stacked with about a one inch spacing between the panels. The preferred material for reacting with the HF is a dry powder. In areas with a high relative humidity, powders which are not reactive with water should be used, for example alumina ($Al_2O_3$). The powder is placed on the surfaces of the panel. Since the panels are corrugated and nested to an extent to prevent a clear path the HF containing air stream must come into intimate contact with the powder.

The concentration of HF treatable by the panels 11 is proportional to the amount of powder loaded onto the panels. To insure an adequate pressure drop to permit passage of air there through, the thickness of powder should not exceed ¼ of the spacing between panels. Otherwise the wind would flow over the wall or blow the powder out. However, it is contemplated that the powder be fixed with a suitable binder having a high porosity to insure powder contact with HF.

The force causing the wind to pass through the wall is provided by the pressure drop created by the wind being deflected upwardly and tending to go over the wall. The pressure drop across the wall generated by this change in direction forces the wind through the wall, with the bottom of the wall having the highest pressure drop available. Thus, flow through the wall is maximized and the amount of HF in the air is reduced to an acceptable level.

Primary Containment Systems

In the first instance, an additive, e.g. sulfolane, is typically mixed with an HF acid alkylation catalyst. The additive reduces the tendency of HF to form an aerosol, thus aiding in containment and cleanup. Then a barrier accumulates and collects pressurized liquid before it has a chance to form a cloud. The additive and barrier are passive systems. An active system in the form of a water spray can be applied to the remaining air borne cloud of HF. Since a water spray has a certain efficiency, at the most about 90%, there will probably be some remaining fumes left. Therefore the fences line modules of the present invention are provided as a final cleanup step to insure reduction of the concentration of HF in the cloud from about 200 ppm to a maximum of 20 ppm.

Other primary containment systems provide that a chemical or petroleum processing unit and the associated storage tanks are completely enclosed in containment vessels. If the containment vessel can withstand process pressures, then no active components are needed to handle an emergency vapor release.

Alternatively, the containment vessel can be made of a relatively easily fabricated material, such as reinforced concrete, which is designed to handle only moderate pressures. In this case large-diameter piping leads to empty emergency storage tankage, which is normally kept empty, so it can receive material released from the process unit. A compressor in the piping is actuated when a pressure rise in the containment vessel is sensed, to assist the flow of released material at high pressure. Provision is made to allow the vapors to relieve to flare or other disposal device in the event that the compressor is unable to cope with the vapor flow.

For more convenient access, the containment can be made of lightweight, easily removed panels. The type of containment would handle only a few psi internal pressure. Vapors from this enclosure are ducted through a water scrubber and to a nearby flare.

Figure 5:
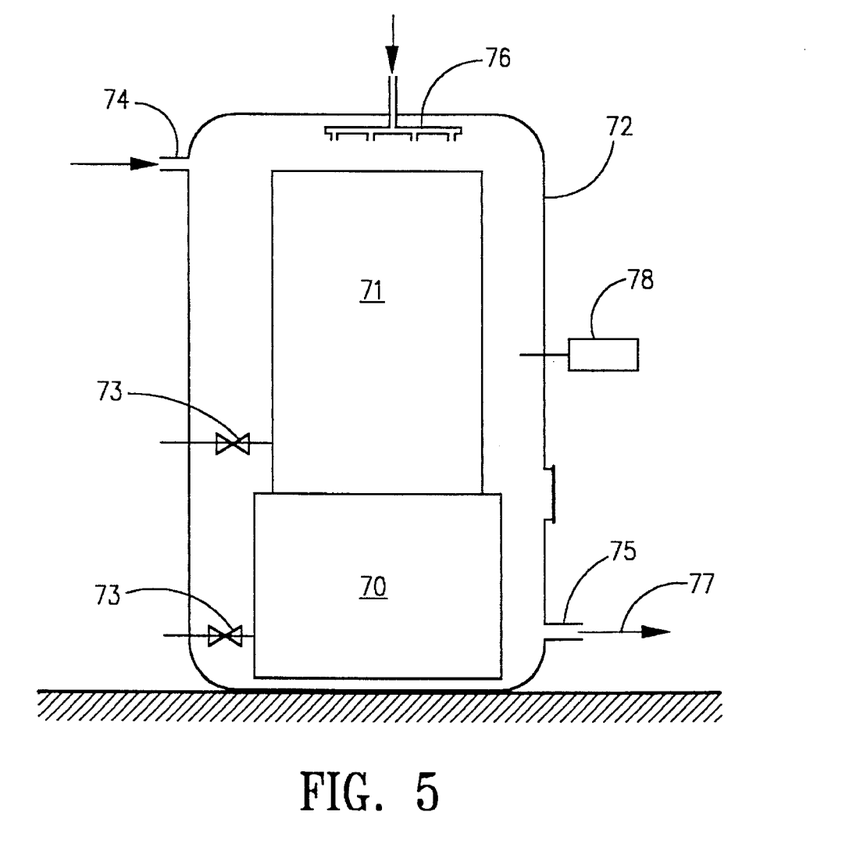
FIG. 5 is a schematic cross-section view of an embodiment of primary means for enclosing and neutralizing a potential source of vapor including a vessel for total containment a vapor leak.

With reference to FIG. 5, there is shown a system for an HF alkylation unit where an HF storage and an reactor 71 are closely coupled. In this case, an outer containment vessel 72 is designed to handle the full HF alkylation process pressure which may be as high as 230 psig. Any leakage, however massive, from the process or storage vessels would be fully contained within the outer containment vessel 72. The containment vessel 72 encloses the various flanges and connections immediately associated with the process reactor 71. Also, fail-closed valves 73 which block off the unit from the rest of the refinery processes are located within the containment vessel 72. Provision is made by an inlet 74 and an outlet 75 under pressure from a pump 77 to purge or evacuate contaminated gas from the space between the inner components 70,71 and the outer vessel 72 as needed, particularly after the inner reactor 71 had been emptied. A water spray 76 can be directed through the inner space, to absorb acid vapors. The containment vessel 72 may be kept pressurized, e.g. with nitrogen, at a pressure slightly higher than the pressure in the process unit, to preclude any leakage. Leakage into the HF unit could be detected by the presence of nitrogen in reactor 71 effluent.

Alternatively, the pressure in the containment vessel 72 can be maintained slightly lower than that of the process unit (preferably 75–90% of the process unit pressure) to facilitate detection of leaks by an HF detector 78 and/or by an increase in pressure, while still offering resistance to massive leakage.

Figure 6:
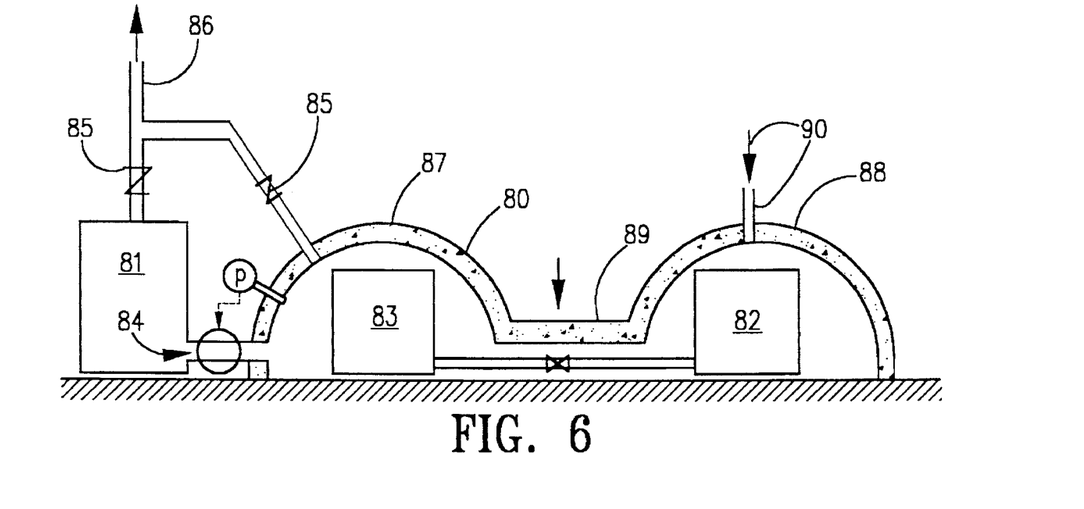
FIG. 6 is a schematic cross-section view of another primary containment embodiment which includes concrete enclosures for two components of an HF alkylation unit.

FIG. 6 shows a containment system in which a reinforced concrete containment vessel 80 is not made to hold full process pressure. Design for 5–30 psig is reasonable for reinforced concrete structures. The containment vessel 80 is formed of two semi-spherical or igloo shaped structures 87,88 interconnected by a tunnel 89. Emergency storage tanks 81 outside the structure 80 are sized to be able to hold the entire contents of an HF reactor 82 and whatever associated storage vessels 83 which cannot be immediately blocked off in emergency. A compressor 84 is sized to handle the flows anticipated from a hole of approximately 1 inch diameter. In the event the released flow rate is too high for the compressor 83 to handle, especially as back pressure builds in the emergency storage tanks 81, provision is made to vent through valves 85 to a flare by line 86. This can be one of the main refinery flares, but greater protection against massive releases is obtained by running very short, large-diameter piping to a nearby low flare. A water spray tower (not shown) before the flare could be used to scrub out HF. The containment vessel can be kept oxygen-free by a purge of inert gas such as nitrogen entering through line 90 and exiting through line 86.

Figure 7:
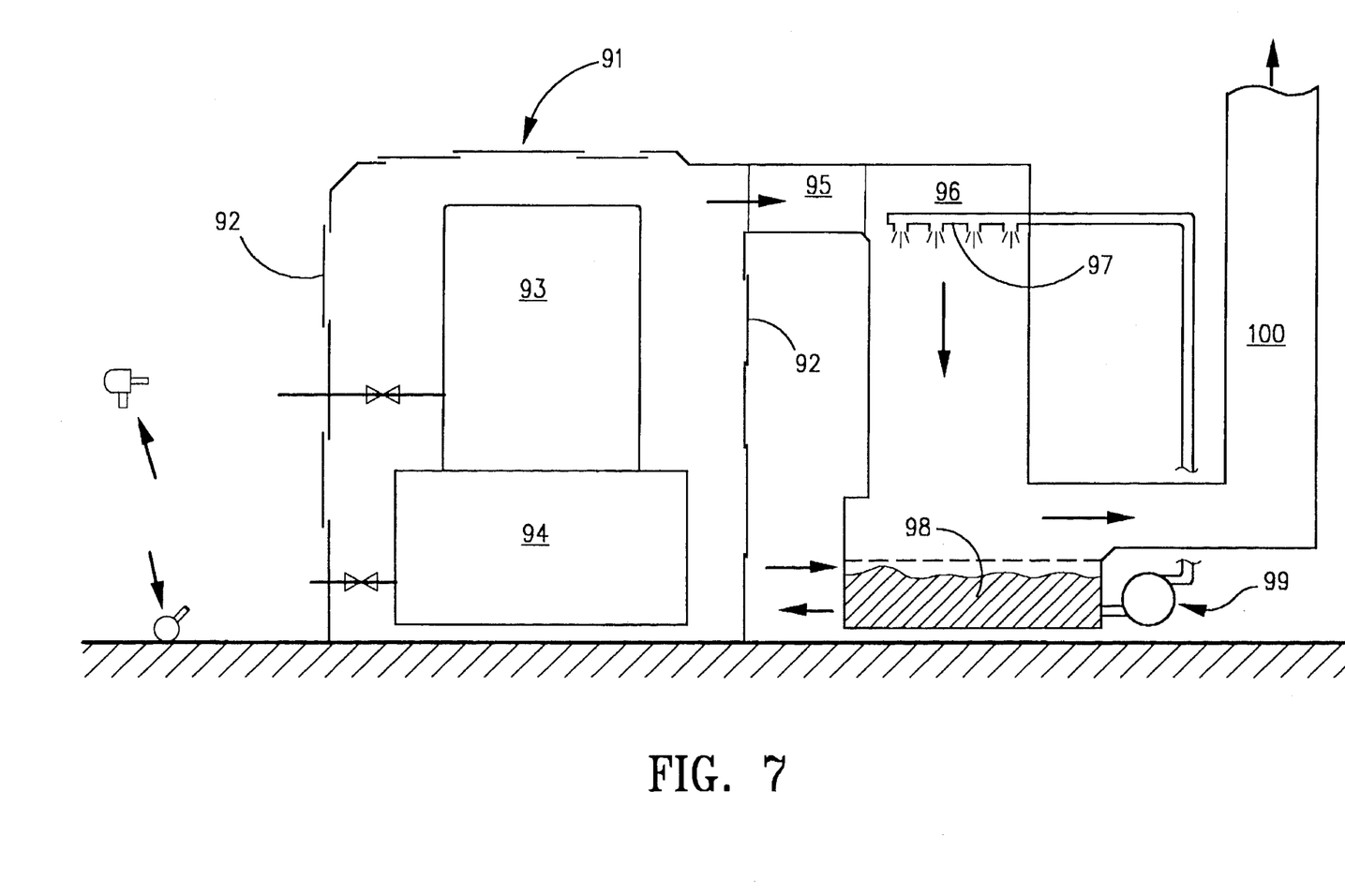
FIG. 7 is a schematic view of another primary containment embodiment with the HF alkylation unit in an enclosure having removable panels.

For improved access by refinery personnel, the containment vessel 91 of FIG. 7 may be constructed of lightweight, hinged, and easily removable sheet metal or plastic panels 92. Most or all of the containment enclosure 91 could be removed for major unit overhauls. For routine access, several hinged panels 92 could be opened to ventilate the enclosure 91 while refinery personnel are working on the reactor 93 or the HF storage 94.

The panels 92 are not designed to withstand any significant pressure. If there is a leak in the alkylation unit 93,94 the cloud travels through a duct 95 connecting the enclosure 91 to a separate water spray area 96 where the HF cloud travels downwardly and cocurrently with the water spray 97. There is a sump 98 at the bottom of the spray area where water is accumulated and then recirculated by a pump 99 back to the spray nozzles 97 to provide a continuous system without the addition of water to contain fumes escaping from the alkylation unit 93,94. Eventually the accumulated water, e.g. at about 10% acid in the water, may have to be removed for neutralization with any suitable base. For example, exchanged with calcium chloride to precipitate the HF as calcium fluoride.

Cocurrent downflow of the HF vapors with the spray water 97, as shown in FIG. 7, helps to pull vapor from the low pressure enclosure 91 and to push the vapor toward a stack 100 leading to a flare. Having the water sprays 97 at the ceiling of the water spray area 96 induces a cloud flow to the system because the momentum exchange from the water droplets to the cloud provides a driving force to the cloud to exit the HF containment vessel 91 through the water spray 97. There is also an additional pressure to pull the cloud generated by a suction through the stack 100 caused by a chimney effect. The chimney effect provides an additional draft for pulling the fumes from the secondary water spray building 96 to the flare.

Figure 8:
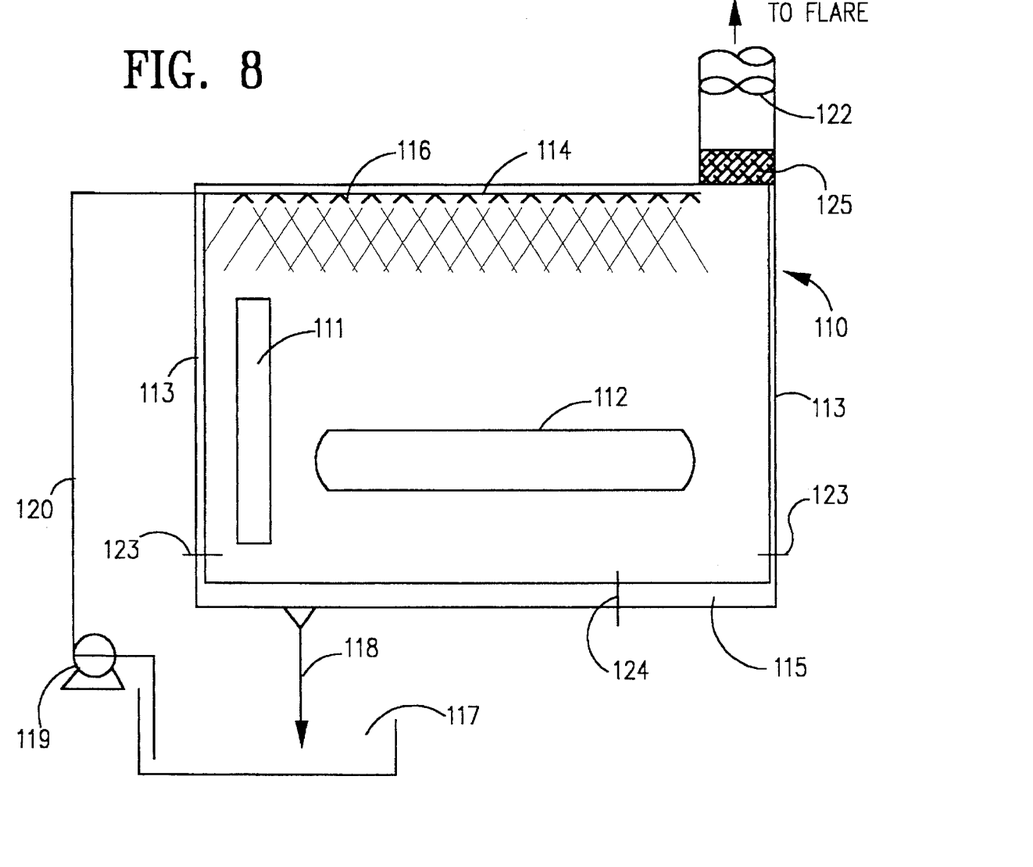
FIG. 8 is a schematic view of another primary containment embodiment in which air is drawn through the enclosure and to a flare.

With reference to FIG. 8, there is shown another primary containment structure 110 housing an HF reactor 111 and an HF settler 112. The interior walls and roof include padded shields 113,114 to maximize liquid rainout, particularly for HF and additive mixtures. The floor of the structure is lined with absorbing material 115 such metal oxides like titanium oxide ($TiO_2$), alumina pellets ($Al_2O_3$), calcium oxide (CaO), or with metal carbonates like lime stone ($CaCo_3$), sodium bicarbonate ($NaHCO_3$), or with metal hydroxides like calcium hydroxide ($Ca(OH)_2$). An HF absorbing water spray is provided by a plurality of nozzles 116. In the embodiment of FIG. 8, water consumption is reduced by providing a sump 117 to collect neutralized acidic water run-off though a conduit 118. A pump 119 recirculates the water by a line 120 to the nozzles 116.

The structure 110 is a low pressure enclosure and is not designed to fully contain a pressurized leak. In addition to the padded shields 113,114, water spray 116, and absorbent floor material 115, there is provided a positive flow of air through the structure by having a fan 122 installed in the ceiling of the enclosure with air being drawn through the sides 123 and bottom 124 of the structure to provide a well defined flow direction through a demister 125 to a flare.

Figure 9:
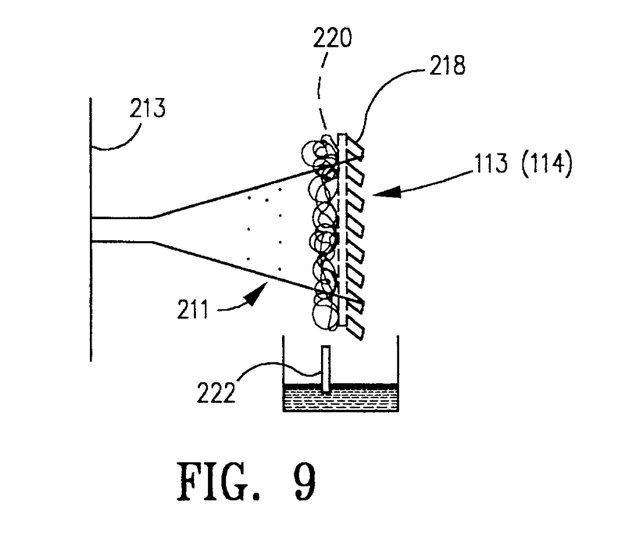
FIG. 9 is a side elevation view of a padded shield used for increasing rainout from a jet of vapor.

The padded shields 113,114 of FIG. 8 are shown in detail in FIG. 9. The shields dramatically increase rainout from a jet exiting a pressurized source 213 such as the reactor 111 of FIG. 8, and thereby substantially minimizes the opportunity for formation of a corrosive and toxic cloud. The shields each comprise an impact plate 218 spaced from the source 213 for deflecting a liquid jet 211 to dissipate its forward velocity and energy. A mesh pad 220 abuts the impact plate 218 and faces the source for initially reducing the velocity and energy of the liquid jet, and for preventing back and radial splash of the liquid jet deflecting off the impact plate 218. Droplets of the substance are thereby coalesced to produce a collectable run-off 222.

The mesh pad 220 preferably has a thickness of from about 0.5 inches to about 10 inches, and a mesh of from about 0.01 inch to about 0.25 inch. The impact plate 218 is preferably normal to the direction of the liquid jet 211, and must be constructed with a suitable thickness and material or backing to withstand the force of the liquid jet. The material for the impact plate is preferably corrosion resistant such as carbon steel plate, or acid resistant plastic such as polypropylene or PVC.

The impact plate 218 and mesh pad 220 are positioned a distance from the source to impact the liquid jet before the liquid jet is capable of expanding to form a substantial aerosol of vaporized substance. This distance is preferably from about 3 inches to about 10 feet, depending upon pressure, temperature and composition of the substance. As the pressure increases, the preferred distance may also increase (or the thickness of the pad may be increased). The pad 220 and plate 218 are described in U.S. Pat. No. 5,286,456, which patent is incorporated herein by reference.

Figure 10:
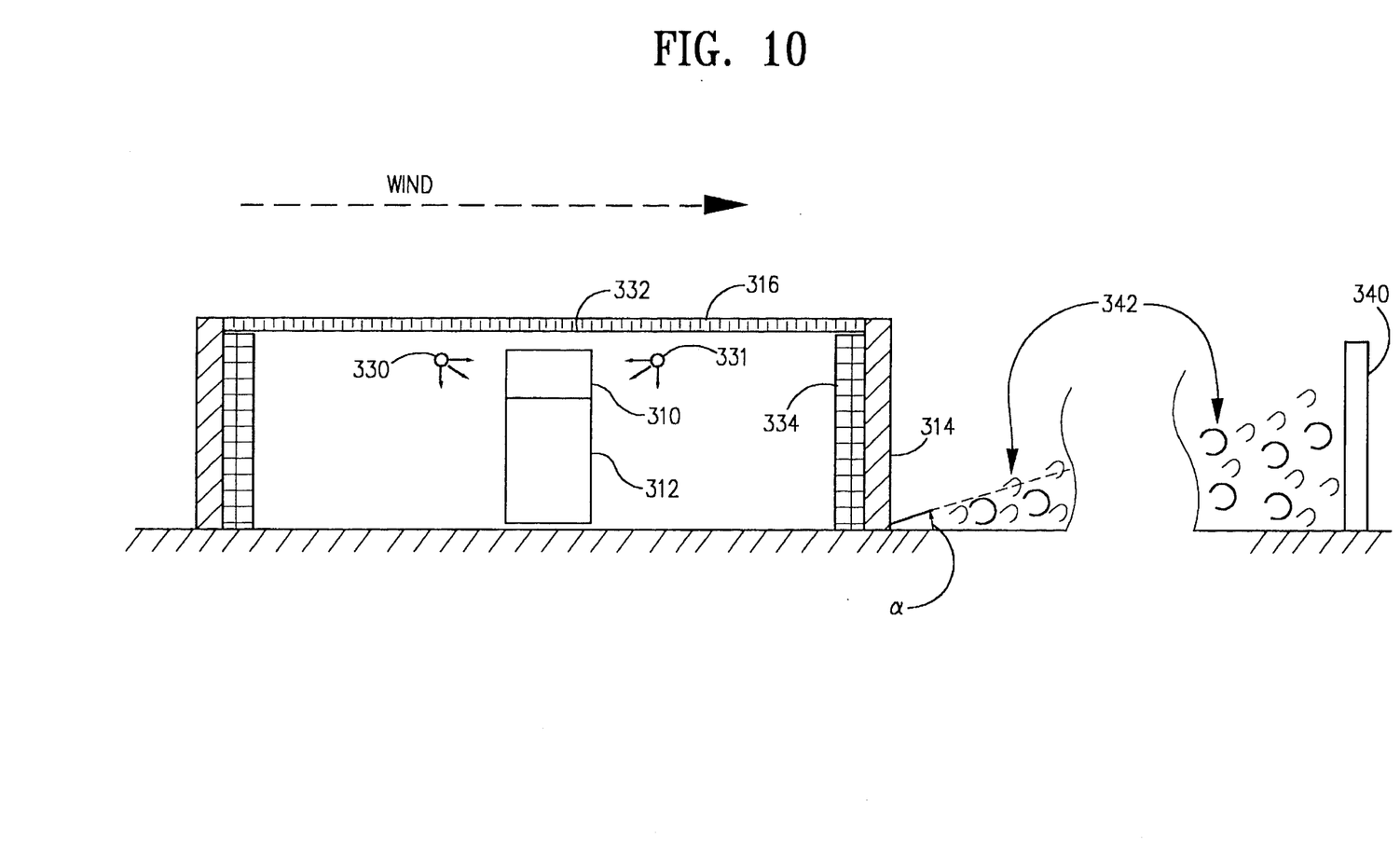
FIG. 10 is a schematic cross-section of a primary containment embodiment and a fence line in accordance with the invention.
Figure 11:
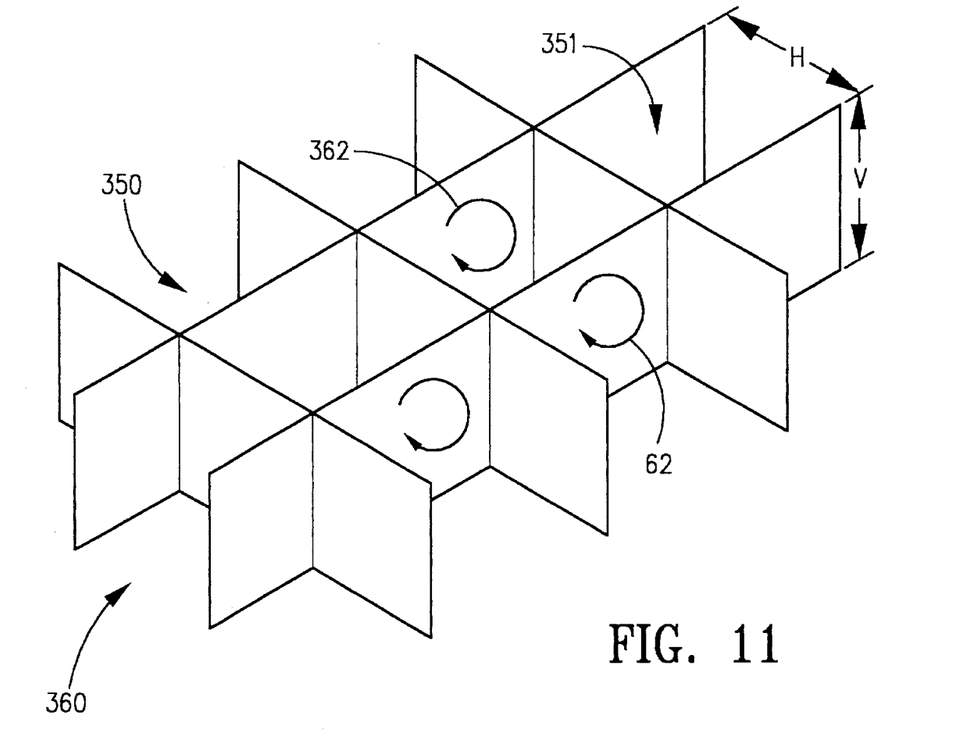
FIG. 11 is a perspective view of one embodiment of the roof of the primary containment enclosure of FIG. 10.
Figure 12:
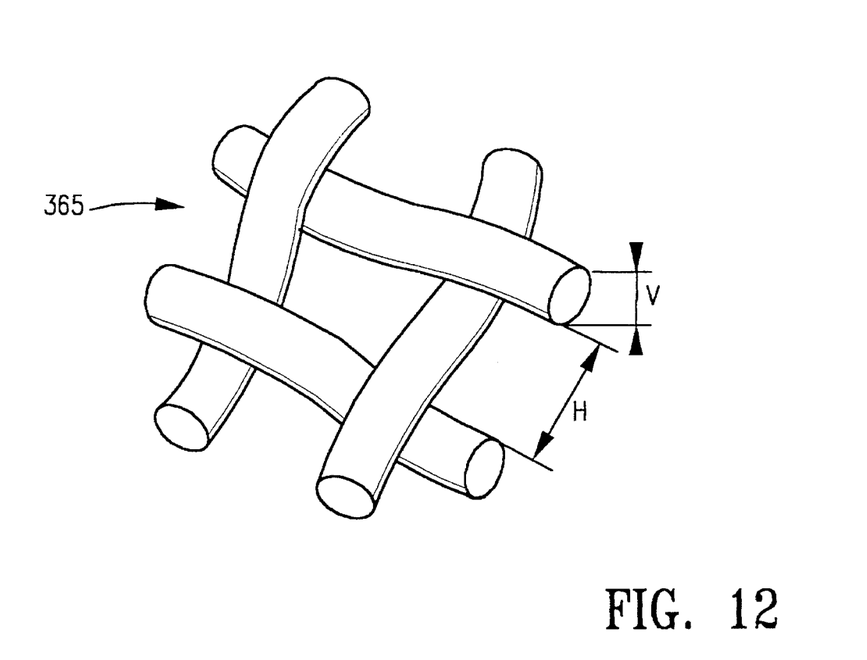
FIG. 12 is another roof embodiment for the primary containment enclosure of FIG. 10.

With reference to FIG. 10, another primary containment structure embodiment includes as a source of hazardous vapor an HF alkylation reactor 310 and HF storage 312. A wall 314 surrounds the source 310,312, and a spray curtain 330,331 is provided. The enclosed area is covered with a porous roof 316, which at least substantially reduces the generation of large-scale wind eddies with the enclosure by interrupting the transmission of momentum from the ambient air to the air inside the enclosure. The enclosure defined by the wall 314 and the roof or cover 316 increases the residence time in the vicinity of the spray, and reduces dilution by the ambient air, both of which increase the effectiveness of the spray 330,331. Since a vapor release is initially contained within the enclosure, the window of response time to the release is increased. Also, a small leak from the source 310,312 can be more readily detected within the confines of the enclosure, because the vapor will build up in the enclosure.

The embodiment of FIG. 10 also includes primary means of sorption in the form of solid or semi-solid material, e.g. a gel, coated 334,332 on the interior walls and in the roof which will absorb the hazardous vapor. These surfaces are impregnated with vapor absorbing dry powders such as metal oxides, e.g. titanium oxide ($TiO_2$), alumina ($Al_2O_3$), calcium oxide (CaO), or with metal carbonates like lime stone powder ($CaCo_3$), sodium bicarbonate ($NaHCO_3$), or with metal hydroxides like calcium hydroxide ($Ca(OH)_2$).

Maintaining a high degree of porosity in the vertical direction of the roof 316 of FIG. 10, preferably greater than about 20% with respect to light air, and atmospheric precipitation, provides a relatively normal atmosphere in the enclosure.

The following aspects permit the porous cover to be most effective as a barrier to air exchange which might be induced by wind shear. With reference to FIG. 11, for a covering 350 with openings or channels 351 constituting greater than 40% of the surface area, the ratio of the horizontal width (H) of the openings in the covering to the vertical depth (V) of the openings is preferably less than 6:1, and more preferably less than 3.1. The ratio (H/V) for the vertical channels 351 of FIG. 11 is about 1. However, for a covering made of netting as shown in FIG. 12 the ratio may be about 2. For a thin metal or polymer plate with large holes in it, this ratio may be greater than 6, but it is then preferred to have the combined area of the holes be less than 40% of the total surface area, in order to minimize the effects of wind shear. If the openings in the covering are not square, e.g. rectangular, circular or irregular, the horizontal width is determined by the square root of the horizontal area of the opening.

Thus, the invention seeks to mitigate the effect to the wind shear across the covering of the enclosure. The solution in accordance with the present invention is to have the porous covering but with a sufficient vertical surface to prevent the main flow of the wind, as shown by the arrow 360, from establishing large circulation patterns through the openings. However, is acceptable to have small circulation patterns 362 within the openings that minimize wind penetration of the covering. If the openings are too short vertically, it is believed that wind shear would be reduced to some extent but with diminishing effectiveness. It is preferred that the ratio (H/V) be less than 6:1 to confine recirculation within the openings. If the ratio is greater than 6:1 there may be some recirculation along with some penetration of the overall wind shear effect.

The upper surface of the covering 316 is maintained substantially horizontal. If the entire covering of the enclosure cannot be maintained in one horizontal plane, it is preferred to arrange the covering surface in two or more horizontal steps joined by one or more substantially impermeable vertical walls.

Another primary containment retrofit is to modify the nozzles of the HF alkylation unit to increase their strength, and to minimize flow in the event of nozzle rupture. The probability of a nozzle rupture is decreased as the diameter of the nozzle is increased. Thus, this modification contemplates changing nozzles of 2" and smaller that are in continuous, concentrated HF acid service in such a way that the modified nozzles have a higher strength and a lower cross-sectional flow area. The higher strength reduces the frequency of failure and the lower flow area reduces the consequence of a failure.

Figure 13:
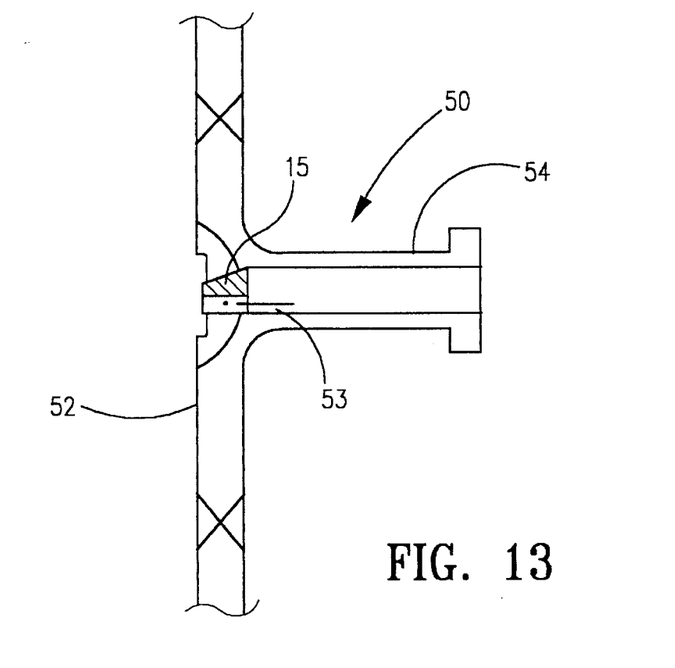
FIG. 13 is a cross-section view of a nozzle for restricting the flow of vapor in the event of a break in the nozzle.

With reference to FIG. 13, a reduction in flow area of a nozzle 50 is accomplished by welding a plug 51 from the inside of vessel wall 52, and then drilling the plug 51 to form a hole 53 having a diameter smaller than the inside diameter of the nozzle 54. By placing the drilled hole eccentrically and flush with the bottom of the pipe, proper drainage is provided when back-flushing.

Figure 14:
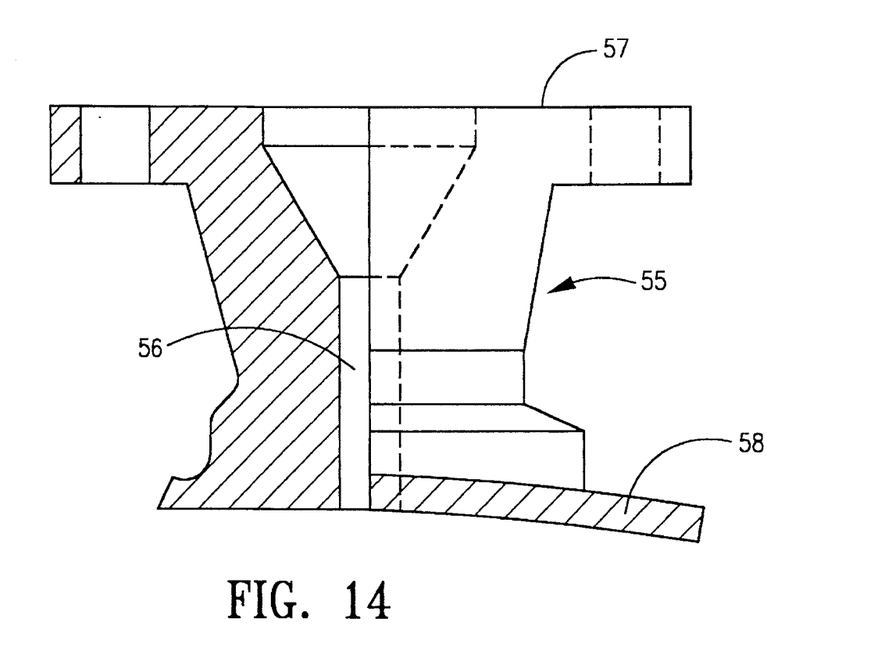
FIG. 14 is a cross-section view of another nozzle for restricting flow of vapor in the event of a break downstream of the nozzle.

Simultaneous strengthening and flow reduction of a nozzle 55 is shown in FIG. 14, where the nozzle shown in FIG. 13 has been strengthened by using a much heavier nozzle 55 having an outside diameter of 3", and a reduced hole diameter 56 extending outwardly from the vessel wall 58.

Thus, the modified nozzle of FIG. 13 could be sheared off flush with the outside vessel wall 52 and still retain its flow reduction. The improvement of FIG. 14 is that the nozzle 55 is strengthened such that a breaking off of the nozzle would more likely occur beyond the flange 57, and again preserving the flow reduction in case of accident.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for containing and neutralizing a heavy vapor cloud comprising:

a potential source of a heavy vapor cloud of a hazardous vapor;

primary means enclosing said source for containing and neutralizing a major portion of said vapor in the event of a leak; and secondary means spaced from said primary means for absorbing said vapor as said vapor passes therethrough, said secondary means comprising a porous absorbent fence line formed of a plurality of spaced parallel corrugated panels having opposing surfaces therebetween, and a reactive composition on the opposing surfaces of said panels for neutralizing and absorbing said vapor therein.

2. The system of claim 1 wherein said primary means contains and absorbs at least about 90% of said vapor.

3. The system of claim 1 wherein said primary means contains and absorbs at least about 99% of said vapor.

4. The system of claim 1 wherein said source is one or more components of an HF alkylation unit, and the vapor is HF.

5. The system of claim 4 wherein the panels are nested with a vertical spacing of from about 0.125 inch to about 3.0 inches.

6. The system of claim 4 wherein said fence line is formed of a plurality of modules, each module containing a plurality of said parallel corrugated panels.

7. The system of claim 6 wherein each one of said modules is sized to contain sufficient reactive composition to mitigate a 200 ppm HF cloud down to at least a 20 ppm HF cloud.

8. The system of claim 4 wherein said fence line has a length at least twice the distance said fence line is from said primary means.

9. The system of claim 4 wherein said fence line is arcuately formed and has a circumferental distance at least twice the radius from said primary means to said fence line.

10. The system of claim 4 wherein said reactive composition is selected from the group consisting of metal oxide, metal carbonate, metal hydroxide and combinations thereof.

11. The system of claim 4 wherein said reactive composition has a thickness of not greater than 25% of the spacing between opposing panels.

12. The system of claim 4 wherein HF in the cloud exiting said fence line is equal to or less than 20 ppm.

13. The system of claim 4 wherein said primary means comprises a containment vessel enclosing said alkylation unit and constructed to withstand full unit pressure, fail-closed valves to isolate said unit, and a water spray in said containment vessel for absorbing HF vapor.

14. The system of claim 4 wherein said primary means comprises a containment vessel for each of an HF alkylation reactor and an HF storage unit, a tunnel interconnecting the containment vessels, emergency storage outside said containment vessels, and a compressor for pumping HF vapor into said emergency storage.

15. The system of claim 14 wherein said primary means further comprises a flare and conduit means for venting said containment vessels to said flare when said compressor is unable to process said HF vapor to said emergency storage.

16. The system of claim 4 wherein said primary means comprises a containment vessel for said alkylation unit, said containment vessel being formed of a plurality of panels which are movable to an open position for ventilating said HF alkylation unit to permit personnel access thereto.

17. The system of claim 16 wherein said primary means further comprises a spray area, a duct interconnecting said containment vessel and said spray area in the vicinity of a plurality of nozzles, a water sump below said nozzles, and a stack leading from the lower portion of said spray area to a flare.

18. The system of claim 4 wherein said primary means comprises a containment vessel for said HF alkylation unit, padded shields lining the interior walls and ceiling of the vessel for maximizing rainout, HF absorbent lining the floor of the vessel, an HF absorbing spray, a duct leading to a flare, and a blower in said duct for drawing air in through ports formed in the vessel.

19. The system of claim 4 wherein the height of said fence line is determined in accordance with:

$$h = (\tan \alpha)d$$

where
- h=fence height, ft.;
- α=angle of elevation at source to the top of HF cloud at d; and
- d=distance of fence from HF source, ft.

20. The system of claim 19 wherein the length of said fence line is determined in accordance with:

$$L = 2d(\tan \beta/2);$$

wherein
- L=length of fence line, ft;
- d=distance of fence from HF source, ft;
- β=enclosed angle of HF horizontal spreading at d.

21. The system of claim 4 wherein the length of said fence line is determined in accordance with:

$$L = 2d(\tan \beta/2);$$

where
- L=length of fence line, ft;
- d=distance of fence from HF source, ft;
- β=enclosed angle of HF horizontal spreading at d.

22. The system of claim 4 wherein said primary means comprises walled surfaces surrounding said vapor source; a roof above said vapor source and forming with said walled surfaces an enclosure for said vapor source, said roof being porous with openings therethrough dimensioned for minimizing wind shear and extending over at least about 20% of the surface area of said roof; and means within said enclosure for absorbing said vapor.

23. The system of claim 4 wherein said porous fence line has a pressure drop there-across for breaking up said vapor into individual streams passing between adjacent panels in said fence line and for preventing said vapor from being deflected up and over said porous fence line.

24. The system of claim 4 wherein said corrugated panels are nested for preventing a clear path through said fence line and for causing said vapor to come into intimate contact with said reactive composition.

* * * * *